United States Patent
Archer, III et al.

(10) Patent No.: US 10,841,538 B2
(45) Date of Patent: Nov. 17, 2020

(54) METHOD AND APPARATUS FOR MANAGING DATA SUBSIDIES IN A COMMUNICATION SYSTEM

(71) Applicant: AT&T Intellectual Property I, L.P., Atlanta, GA (US)

(72) Inventors: Virgil Archer, III, Los Angeles, CA (US); Kareemulla Khan, Hawthorne, CA (US); Arlene Cava, Sylmar, CA (US); Robert Kronebusch, Claremont, CA (US); Xavier Riley, Los Angeles, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 179 days.

(21) Appl. No.: 16/054,620

(22) Filed: Aug. 3, 2018

(65) Prior Publication Data
US 2020/0045266 A1 Feb. 6, 2020

(51) Int. Cl.
*H04N 7/173* (2011.01)
*H04L 29/06* (2006.01)
(Continued)

(52) U.S. Cl.
CPC ..... *H04N 7/17318* (2013.01); *H04L 63/0807* (2013.01); *H04N 7/162* (2013.01);
(Continued)

(58) Field of Classification Search
None
See application file for complete search history.

(56) References Cited

U.S. PATENT DOCUMENTS 7,701,870 B2  4/2010  Bhatia et al.
7,831,473 B2  11/2010  Myers et al.
(Continued)

FOREIGN PATENT DOCUMENTS

WO  20130173308 A1  11/2013

OTHER PUBLICATIONS

"AT&T Sponsored Data API FAQs", https://developer.att.com, Jul. 7, 2016, 2 pages.
(Continued)

*Primary Examiner* — Justin E Shepard
(74) *Attorney, Agent, or Firm* — Guntin & Gust, PLC; Robert Gingher

(57) ABSTRACT

Aspects of the subject disclosure may include, for example, a method, including, for each configuration of a client device of a media content service, accessing a headend of the media content service, and for each media content item of a plurality of media content items accessible via the headend of the media content service, receiving a media content identifier associated with the media content item, sending the media content identifier to an advertising server, receiving, from the advertising server, a set of advertising items associated with the media content identifier, where each advertising item of the set of advertising items includes advertising locator information, and aggregating the set of advertising locator information associated with the media content identifier to generate a plurality of advertising locators associated with the plurality of media content items, and, in turn, storing the plurality of advertising locators associated with the plurality of media content items accessible via the headend of the media content service according to the configuration of the client device as a manifest of advertising items for the configuration of the client device. Other embodiments are disclosed.

20 Claims, 7 Drawing Sheets

(51) Int. Cl.

| | | |
|---|---|---|
| *H04N 21/2343* | (2011.01) | |
| *H04N 21/234* | (2011.01) | |
| *H04N 7/16* | (2011.01) | |
| *H04N 21/24* | (2011.01) | |
| *H04N 21/25* | (2011.01) | |
| *H04N 21/2543* | (2011.01) | |
| *H04N 21/2547* | (2011.01) | |
| *H04N 21/254* | (2011.01) | |
| *H04N 21/258* | (2011.01) | |

(52) U.S. Cl.
CPC . *H04N 21/23424* (2013.01); *H04N 21/23439* (2013.01); *H04N 21/24* (2013.01); *H04N 21/2407* (2013.01); *H04N 21/25* (2013.01); *H04N 21/251* (2013.01); *H04N 21/254* (2013.01); *H04N 21/2542* (2013.01); *H04N 21/2547* (2013.01); *H04N 21/25435* (2013.01); *H04N 21/25891* (2013.01)

(56) References Cited

U.S. PATENT DOCUMENTS

| | | | |
|---|---|---|---|
| 8,688,074 | B2 | 4/2014 | Grefen et al. |
| 8,879,417 | B2 | 11/2014 | Hodges |
| 8,886,163 | B2 | 11/2014 | Albisu |
| 9,275,405 | B1 | 3/2016 | Delker et al. |
| 9,489,666 | B2 | 11/2016 | Sundar et al. |
| 9,582,816 | B2 | 2/2017 | Kiernan et al. |
| 9,589,282 | B2 | 3/2017 | Lientz et al. |
| 9,674,685 | B2 | 6/2017 | Buonomo et al. |
| 9,826,105 | B2 | 11/2017 | Sharma et al. |
| 10,439,814 | B1 * | 10/2019 | Grubin .......... H04L 9/3213 |
| 2007/0149168 | A1 | 6/2007 | Hariki et al. |
| 2011/0078019 | A1 | 3/2011 | Klappert et al. |
| 2012/0209990 | A1 | 8/2012 | Honore et al. |
| 2014/0370846 | A1 | 12/2014 | Neal |
| 2015/0025976 | A1 | 1/2015 | Guo et al. |
| 2016/0094972 | A1 | 3/2016 | Girard et al. |
| 2016/0205720 | A1 | 7/2016 | Mandanapu |
| 2017/0126903 | A1 | 5/2017 | Cohen et al. |
| 2017/0178193 | A1 | 6/2017 | Jagannath et al. |
| 2017/0279681 | A1 | 9/2017 | Vuolteenaho et al. |
| 2018/0063270 | A1 | 3/2018 | Naar et al. |

OTHER PUBLICATIONS

"Binge on", https://support.t-mobile.com/docs, Mar. 17, 2018, 3 pages.

Kakhki, Arash M. et al., "BingeOn Under the Microscope: Understanding T-Mobile's Zero-Rating Implementation", 2016, 6 pages.

* cited by examiner

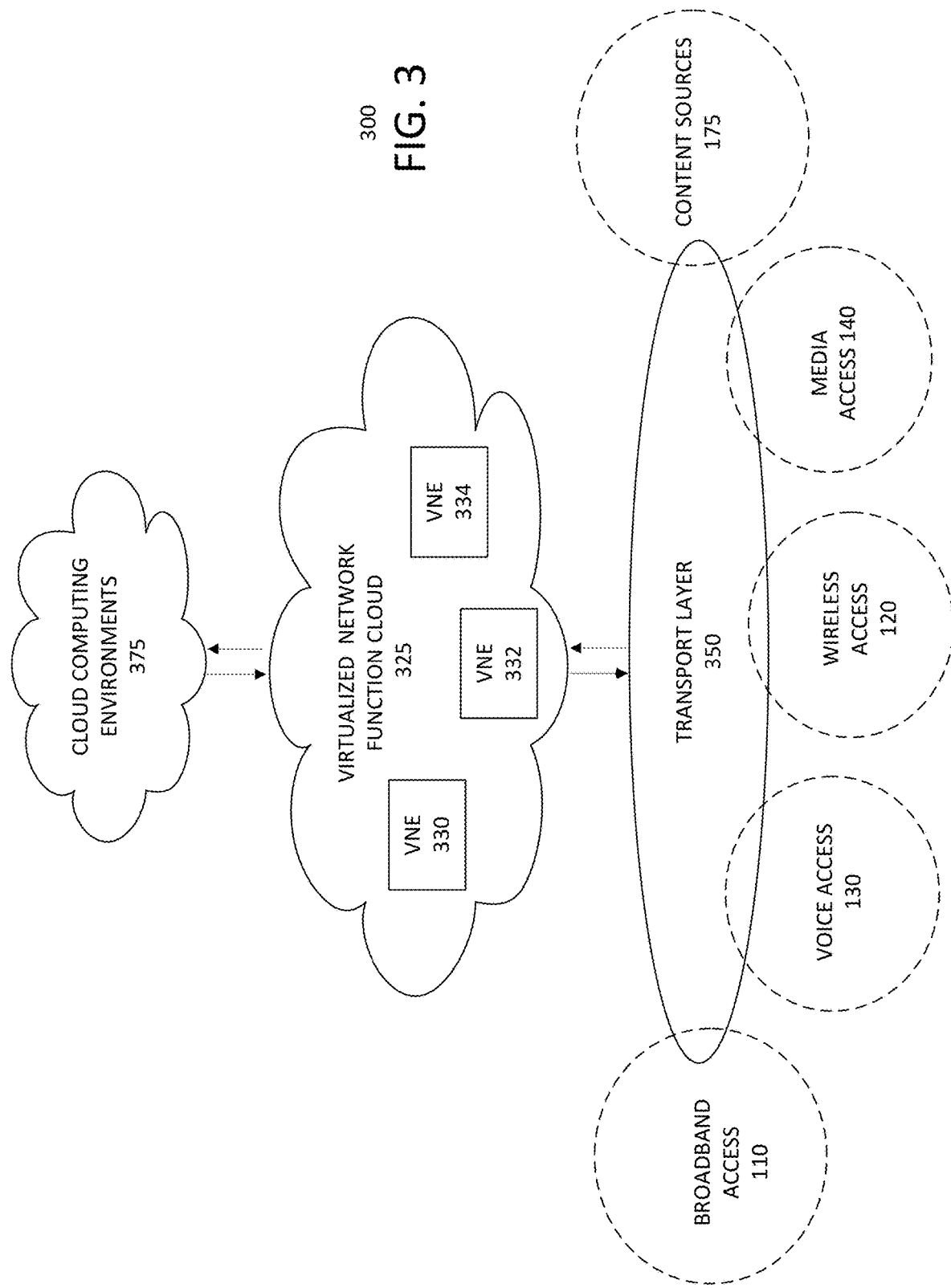

МЕТHOD AND APPARATUS FOR
MANAGING DATA SUBSIDIES IN A
COMMUNICATION SYSTEM

FIELD OF THE DISCLOSURE

The subject disclosure relates to a method and an apparatus for managing data subsidies in a communication system.

BACKGROUND

There is an expanding ecosystem of devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, we should expect connection models to expand, flow into one another and greater cooperative interaction between devices to emerge. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
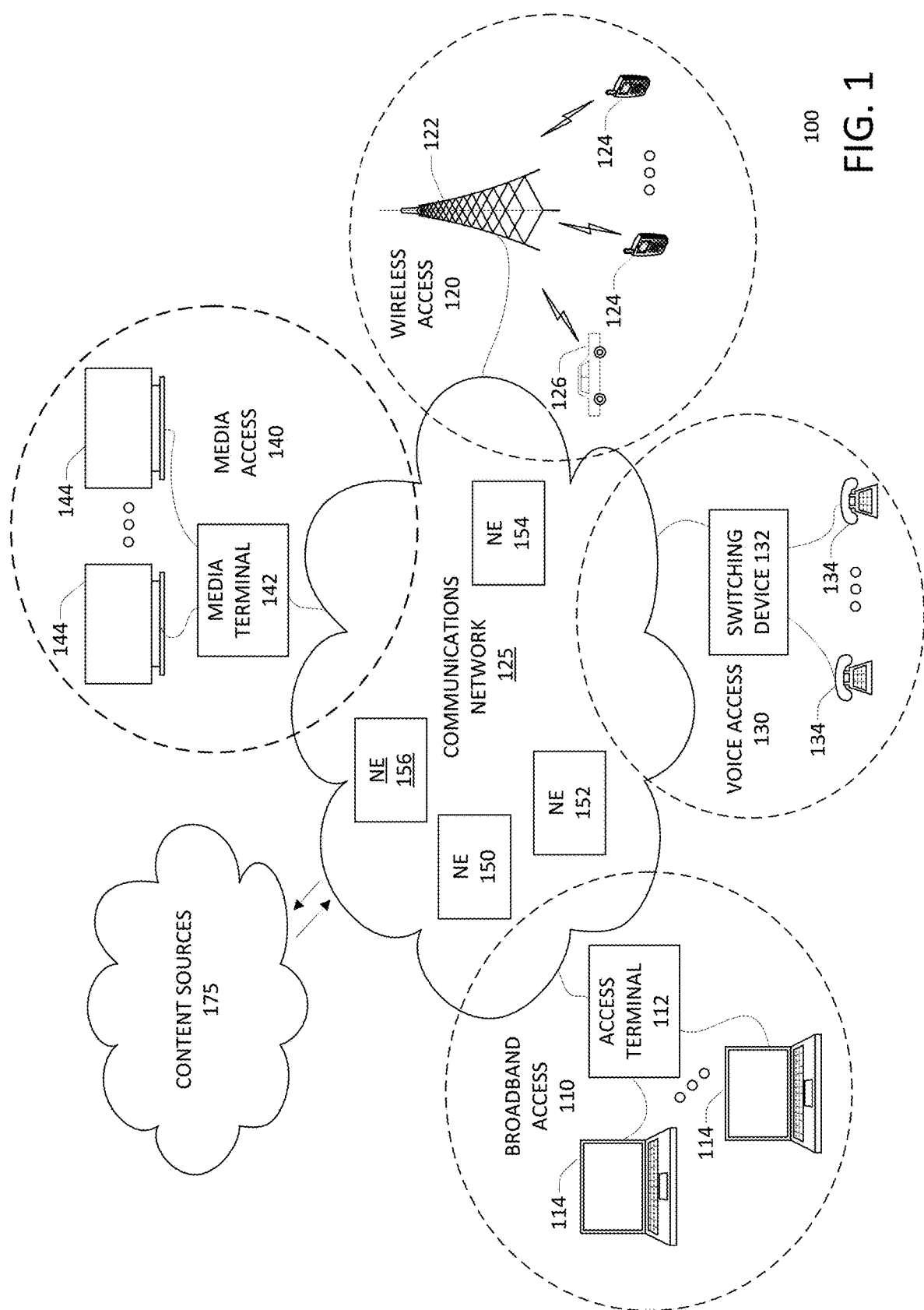
FIG. 1 is a block diagram illustrating an example, non-limiting embodiment of a communications network in accordance with various aspects described herein.

The subject disclosure describes, among other things, illustrative embodiments for a method and an apparatus for identifying dynamically inserted advertising that a network service provider intends to sponsor as part of a subscription data plan. The embodiments include a server that can access a headend of a media content server using an authentication token that emulates a client device. The server can search for media content available from the media content server and can receive a content identifier from the headend when the content is found. The server can provide the content identity to an advertising server, which can select an advertisement that can be inserted into a stream with the content. The server can receive a locator for the advertisement and can aggregate the locator with other locators collected during the search of the available content. The locator information can be classified by one or more configurations of a potential client device. The server can save the aggregated, filtered data at a proxy server as a white list manifest. The advertising locators in the manifest can be used by the network service provider to identify advertising for which the provider will refrain from charging a subscriber data access fees. Other embodiments are described in the subject disclosure.

One or more aspects of the subject disclosure include a machine-readable storage medium, including executable instructions that, when executed by a processing system including a processor, facilitate performance of operations, including, for each configuration of a client device of a media content service, accessing a headend of the media content service. The accessing of the headend of the media content service can include an authorization token to simulate a client device of the media content service. The operations can also include receiving a permission to access the headend of the media content service according to the authorization token. For each media content item of a plurality of media content items accessible via the headend of the media content service, the operations can include searching for the media content item, receiving a media content identifier associated with the media content item responsive to the searching, and sending the media content identifier to an advertising server. The operations can also include receiving, from the advertising server, a set of advertising items associated with the media content identifier. Each advertising item of the set of advertising items can include locator information. The operations can include aggregating the advertising locator information associated with the set of advertising items for the media content identifier to generate a plurality of advertising locators associated with the plurality of media content items. In turn, the operations can include storing the plurality of advertising locators associated with the plurality of media content items accessible via the headend of the media content service according to the configuration of the client device as a manifest of advertising items for the configuration of the client device.

One or more aspects of the subject disclosure include a device, comprising a processing system including a processor and a memory that stores executable instructions that, when executed by the processing system, facilitate performance of operations, including, for each configuration of a client device of a media content service, accessing a headend of the media content service. The accessing can include sending an access request to the headend of the media content service. For each media content item of a plurality of media content items accessible via the headend of the media content service, the operations can include receiving a media content identifier associated with the media content item, sending the media content identifier to an advertising server, and receiving, from the advertising server, a set of advertising items associated with the media content identifier. Each advertising item of the set of advertising items can include advertising locator information. The operations can include aggregating the advertising locator information associated with the set of advertising items for the media content identifier to generate a plurality of advertising locators associated with the plurality of media content items. In turn, the operations can further include storing the plurality of advertising locators associated with the plurality of media content items accessible via the headend of the media content service according to the configuration of the client device as a manifest of advertising locators for the configuration of the client device. The manifest of advertising locators can facilitate network delivery rate arrangement according to a subscription agreement.

One or more aspects of the subject disclosure include a method performed by a processing system including a processor and including, for each configuration of a client device of a media content service, accessing a headend of the media content service. For each media content item of a plurality of media content items accessible via the headend of the media content service, receiving a media content identifier associated with the media content item, sending, by the processing system, the media content identifier to an advertising server, receiving from the advertising server, a set of advertising items associated with the media content identifier, and aggregating the set of advertising items associated with the media content identifier to generate a plurality of advertising items associated with the plurality of media content items. Each advertising item of the set of advertising items can include advertising locator information. The method can also include, in turn, storing the plurality of advertising locators associated with the plurality of media content items accessible via the headend of the media content service according to the configuration of the client device as a manifest of advertising locators for the configuration of the client device.

Referring now to FIG. 1, a block diagram is shown illustrating an example, non-limiting embodiment of a communications network 100 in accordance with various aspects described herein. For example, communications network 100 can facilitate in whole or in part an apparatus for performing a method for identifying dynamically inserted advertising that a network service provider intends to sponsor as part of a subscription data plan. The embodiments include a server that can access a headend of a media content server by emulating a client device, search for media content available from the media content server, receive a content identifier from the headend when the content is found, provide the content identity to an advertising server, receive a locator for a selected advertisement, and save the locator with other locators collected during the search of the available content as a white list manifest. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
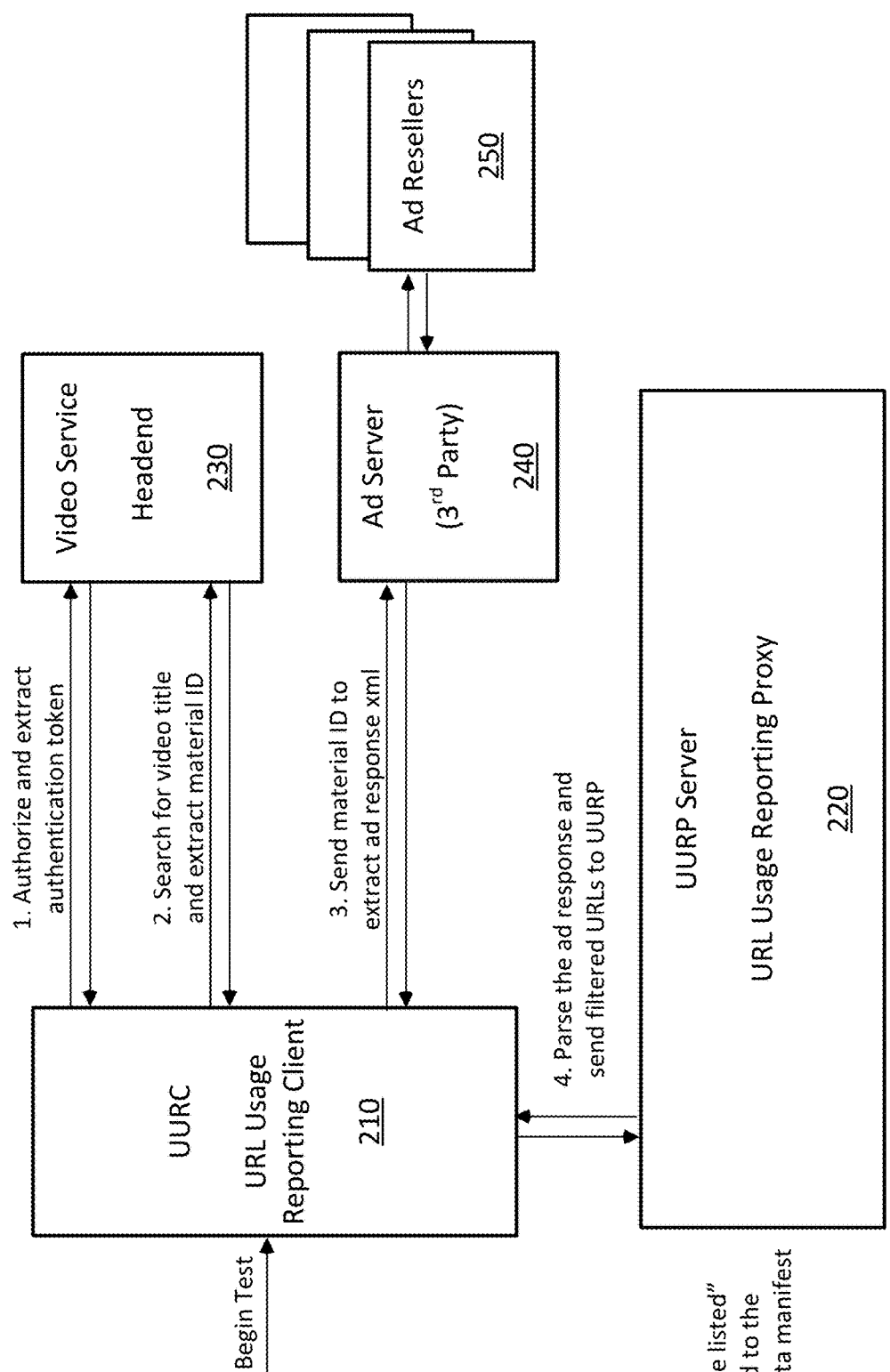
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein.

Consumers access media content and other communication services via cellular devices, such as mobile communication devices, via wireless connections to communication networks managed by network service providers. These communication networks include large infrastructures, wireless spectrum investments, cellular network stations, data processing centers, fiber optic networks, routers, satellite connections, and expert personnel who build, operate, and maintain the networks. Vast Infrastructure and personnel represent very substantial costs, which the network service providers offset by charging subscription and data access fees to consumers, who register their cellular devices with their services.

Network service providers often market subscription plans based on data usage. For example, a subscription plan may allow a customer, or customer grouping, unlimited access to the communication network for services such as calls or texts. Further, the subscription plan may allow the customer to download up to a specified amount of data from the communication network without additional charges. If this amount is exceeded, then the customer may be charged for this additional usage at a specified data rate. Some subscription plans provide (for a greater monthly fee) an unlimited amount of data to be downloaded. These plans may include additional limitations, such as "soft" limits, where the speed of the data delivery may vary once the customer has exceeded a certain threshold of monthly data usage. In this highly-competitive market, consumer sentiment can be affected by how a network service provider handles delivery and billing of data over its communication network. Consumers are keenly aware of "overages," where they may be charged additional fees and/or experience reduced data delivery speed for exceeding data limits.

While consumers have tools for controlling data usage, such as maximizing usage of off-cellular network connectivity, such as wireless local area networks (WLAN) at locations serviced by wired network providers, and selectively shutting off data download capability, there are certain aspects of data usage that are difficult for consumers to control. One such aspect is the amount of advertising data that may be delivered to the consumer's device along with content that the consumer may have selected. For example, a customer may be interested in accessing a movie from an Internet website. As the content of the movie is streamed to the customer's device the customer's network service provider tracks the amount of data that is downloaded through its network. To the customer's dismay, advertising data may have been added to the streaming content. The customer will not have to deal with viewing the advertising but the data for the advertising will be added to the downloaded total. As a result, the customer may use up a substantial part of the subscription limit, or soft limit, for data that the customer does not want. Streaming advertisements can use up to 15 MBs per minute. This situation can cause customer dissatisfaction with services and adversely affect customer retention.

Network service providers have explored several options for dealing with the issue of advertising that is added into streaming content via the process of inserted advertising (IA). In one approach, some providers have added an additional percentage of data to their subscription plans to account for IA. So, for example, a data plan that provides 10 GB per month may include hidden "bonus" data (e.g., 500 MB) that is provided to the customer to cover the delivery of advertising that is inserted with content. Some network service providers simply state in their legal disclaimers that they do not sponsor third party ads, and, therefore, customers have to cover the data charges associated with these ads. An alternative approach is for the network service provider to "sponsor" or subsidize the data associated with the IA. For example, the network service provider can have an arrangement, whereby it is made aware of a set of advertisements that may be included with content by one or more media content services. And, once aware of these particular advertisements, the network service provider can selectively choose to waive the data charges for this IA. In this arrangement, the network service provider is effectively sponsoring the advertising by paying for the data delivery of the IA.

In order for the network service provider to sponsor the advertising, it must possess and maintain a fixed list of the advertising that is provided by the content service. This list, also called a manifest or "white list." The manifest includes a set of advertising locators that identify where the particular advertisements are located in the Internet. The advertising locators can be in the form of a universal resource locator (URL). When the network service provider streams media content to the customer's device, it can monitor the content for the presence of IA. When advertising is detected, the network service provider can compare locator information that is included, for example, in header information that is transmitted along with the advertising against the manifest to determine if the detected IA is a "white listed" item. If it is, then the network service provider with deliver the data associated with the IA without the customer incurring a data charge. If the IA is not found on the white list, then the customer is charged.

A disadvantage of the current approach is that the manifest is a static white list that must be physically provided to the network service provider by the content service. If the set of content available at the content service provider changes, or if the set of IA associated with content changes, then the manifest can quickly become outdated, which can result in the customer incurring charges for IA that the network service provider intended to sponsor. Another disadvantage of the current approach is that the selection of IA may not be under the direct control of the content service. For example, one or more third party advertising services and/or advertising resellers may determine all or part of the advertising that will be inserted with the content. These situations illustrate that the advertising may, in fact, be dynamic in nature. Thus, dynamically-inserted advertising (DIA) creates problems in compiling the white list from third party sources and in maintaining the white list in the face of frequently changing content and advertising.

Referring again to FIG. 2A, in one or more embodiments, a system 200 is illustrated for a communication network 125 to handle DIA in a sponsored-advertising, or zero-rate, subscription model. The system 200 facilitates detecting and processing all DIA locators (e.g., URLs) associated with a content service, such as a specific video-on-demand (VOD) asset. In one embodiment, the system 200 facilitates the use of dynamic advertising, where advertisements are selected for a customer based on one or more aspects of a profile of the customer. Profile factors can include, for example, the customer's age, location, gender, and/or type of device being used (e.g., iPhone, Android tablet, etc.). The system 200 can identify all of the DIA that a content service and/or its advertising partners might be select for insertion with content that is provided to a customer. The system 200 can collect and store in a manifest advertising locators for all of these potential advertising choices all of the potential varieties of customer profiles. The manifest can be used by the network service provider to sponsor all of the DIA that is potentially generated by the content service, so that the customer may not charge for data fees for advertising coming from this service, which can result in more satisfied customers.

In one or more embodiments, the system 200 can include a Universal URL Reporting Proxy (UURP) 220. The UURP server 220 can maintain a manifest with a "white list" of all of the DIA, which the network service provider may sponsor. The system 200 can include a URL Usage Reporting Client UURC 210. The UURC 210 can include a server device with memory and network access. The UURC 210 can perform a method for collecting locator information for all of the potential DIA that might be added to content streamed to a customer device 124 via a content source 175. The UURC 210 can aggregate the collected DIA information and use this information to provision and maintain the white list manifest of sponsored-data at the UURP 220.

In one or more embodiments, the UURC 210 can be identified as a client of a media service 175. In one embodiment, the UURC 210 can be a virtual machine (VM) operating at a data center of the network service provider. In one embodiment, the media service 175 can provide VOD services to a group of subscribers. Each subscribing device 124 can have an authorization token which has been issued by the media service 175 under a license agreement. As part of a partnership agreement between the network service provider and the media service 175, the media service 175 can issue a token to the UURC 210. The UURC 210 can use the token to present itself to a Video Service Headend 230 of the media service 175 "as if" the UURC was a typical client device 124. The "real" clients are mobile devices 124. The UURC 210 can send a request to the Video Service Headend 230 for a media session. The Video Service Headend 230 can evaluate the request by determining if an authentication token from the UURC 210 is valid.

In one or more embodiments, once the UURC 210 is authenticated, the UURC 210 perform a series of searches upon the database of the Video Service Headend 230. The scope of the searches can vary depending upon the purpose of the test. In one embodiment, the UURC 210 can begin with a particular configuration of client devices 124. For example, the Video Service Headend 230 can store the identities of tens of thousands of titles of media content. However, for each title, the Video Service Headend 210 can further store multiple instances of that title, where each instance is unique to a configuration of the client device 124. In various embodiments, the configuration of the client device 124 can include the type of the client device (e.g., Apple™, Andriod™), one or more capabilities of the client device (e.g., display size, display aspect ratio, display density, codec capabilities, download speed, processing speed, visual and/or hearing impaired user capabilities). The configuration can also include user-selected features for the client device 124 (e.g., second display, 3D googles). In one embodiment, the UURC 210 is configured to search the Video Service Headend 230 based on every combination of device configurations and media titles. In this case, the UURC 230 could, for example, search for each combination of the title, "The Lord of the Rings: The Two Towers," and each available configuration, such Apple, Android, large display, small display, and 3D. If the Video Service Headend has a unique version of "The Lord of the Rings: The Two Towers," for each of these configurations, then the Video Service Headend 230 could return a unique material identifier for each version (e.g., ID1 for "The Lord of the Rings: The Two Towers," Apple, large screen, in 2D, ID2 for "The Lord of the Rings: The Two Towers," Android, large screen, in 2D, and so on). The UURC 210 could be collecting advertising information for 16 different versions of this title in this case.

In one embodiment, the UURC 210 can begin searching for every content title—configuration combination that is available to a client through the Video Service Headend 230 by, first, requesting a list of every available title from the Video Service Headend 230. After storing this list, the UURC 210 can then proceed to search for each title in the list separately. In another embodiment, the UURC 210 can access a separate list of content from a different source. For example, the UURC 210 can maintain its own list of content, independent of the Video Service Headend 230 and use this list, regardless of the actually content available at the Video Server Headend 230. For example, the network service provider may implement a sponsorship or zero-rate feature only for advertisements associated with its own list of media titles, rather than for a list that is based on the set of titles available at the Video Service Headend 230.

In one embodiment, the UURC 210 can search for each title and each configuration-based version of that title sequentially (e.g., search for "The Lord of the Rings: The Two Towers," Apple, large screen, in 2D, to obtain ID1; next search for "The Lord of the Rings: The Two Towers," Android, large screen, in 2D, to obtain ID2, and so on). In another embodiment, the UURC 210 can simply search from "The Lord of the Rings: The Two Towers" and see how many versions are returned. In one embodiment, the search of the Video Service Headend 230 titles may take many passes, with each pass focused a particular configuration category. In another embodiment, a single, long pass of the title database can be performed, where each combination of title and configuration is obtained in that single pass, then the collected data is sorted into configuration categories.

In one or more embodiments, after UURC 210 searches for and finds a video title (for a configuration) at the Video Service Headend 230, the UURC 210 can extract s material identifier from the return response of the Video Service Headend 230. The material identifier provides a unique identification for this configuration version of the content title. Once the UURC 210 has extracted the material identity for the version of the content title, the UURC 210 can send a request to an advertising server 240 that is associated with the Video Service Headend 230. The adverting server 240 is, generally, a third party service that is responsible for providing a list of one or more advertisements which will be inserted into a data stream of the content that is identified by the material identifier. The advertisements may be selected based on a number of factors, including a user profile of the subscriber associated with the client device 124. In this case, since the UURC 210 is not an actual subscriber, no user profile information is available. Consequently, the advertising server 240 can return a set of advertisements based only on the material identifier of the version of the content that was returned to the UURC 210 by the Video Service Headend 230. In this embodiment, the UURC 210 can access advertising selections that are generic, so all users can be accounted for.

In one or more embodiments, the advertising server 240 may derive its list of advertisements on its own or may receive one or more advertisement selections from one or more advertising reseller servers 250. The advertising reseller servers 250 can provide a means for third party brokers to market advertising through the advertising server which is, again, typically based on user profile information. Here, in the absence of profile information, the advertising resellers 250 should provide generic sets of advertising. In one or more embodiments, the UURC 210 can be equipped with a "mock" user profile that be used to mimic one or more generic types of users. For example, the UURC 210 can be configured to perform a test of the entire content database while pretending to be a male subscriber and another test while pretending to be a female subscriber. The UURC 210 may be able to extract additional locations for sources of advertising by including generic profile information with the material identifier.

In one or more embodiments, the advertising server 240 can respond to the UURC 210 by providing the UURC 210 with a set of advertisements that it has selected based on the material identifier. In one embodiment, the list of advertisements may version that cover all configurations of the client device. In this case, the UURC 210 can parse the list of advertisement locators and filter/categorize the information according to these configurations. In another embodiment, the list of advertisements may be only for a specific configuration of the client device. In this case, the UURC 210 will need to repeatedly search the Video Service Headend 230 to obtain each configuration version and, then, obtain version-specific advertisement locations from the advertising server 240.

In one or more embodiments, the UURC 210 can send aggregate the advertising location information that is provided by the advertising server based on the material identifier. After the location information is collected and stored for this content item, the UURC 210 can return to its session with the Video Service Headend 230. The UURC 210 can search for the next content item in its list. For example, the UURC 210 may be responsible for aggregating the advertising locator information for 20,000 content titles. After each content item in the list has been searched, categorized by configuration, and aggregated to form a "white list" of advertising locators that can be saved as a manifest file. The UURC 210 can save this manifest file at the UURP 220 as a Sponsored Data manifest. The Sponsored data manifest can include a list of URLs which locate the source of the advertising that is currently selectable for DIA insertion by the advertising server for each material identifier in the content list.

For example, a customer can be streaming a program from a media server 175 to her client device 124. During presentation of the program, the advertising server 240 may select advertisements from an advertising reseller server 250. The advertisements can then be inserted in the streaming program. The network service can detect the advertisements and inspect the URLs that are associated with the source of these advertisements. The URLs can then be compared to the Sponsored Data manifest that is stored in the UURP 220. If the URLs are matched in the manifest, then the network service provider can refrain from charging the customer's account for the data associated with the delivery of the advertising.

In one or more embodiments, the process of searching the entire database of Video Service Headend 230 for titles and collecting advertising URLs associated with advertisements selected for these titles can be repeated periodically. For example, the UURC 210 can run the advertising survey program on a daily basis to keep the manifest that is stored in the UURP 220 up to date. In one embodiment, the UURC can be triggered to run based on an update event. For example, if the media service 175 adds new content, or if the media server 175 adds more than a threshold amount of new content (e.g., greater than ten new items or greater than 2% new items), then the UURC 220 can be triggered to run the advertising survey. In another example, the advertising survey could be triggered when the advertising server 240 adds a new advertising reseller or when an advertising event is detected (e.g., a major ad campaign is launched, a new broadcasting season, a date in a political calendar is reached). In another embodiment, the advertising survey can ran as a background activity at any time when the system resources are relatively unstrained by demand (e.g., late night).

In one embodiment, the UURC 210 can reduce the scope of the advertising survey by capturing advertising location information from active, client devices 124. The UURC 210 can use this information, along with information regarding the configuration of these client devices 124, to update the Sponsored Data manifest on an on-going, real-time basis.

Figure 2B:
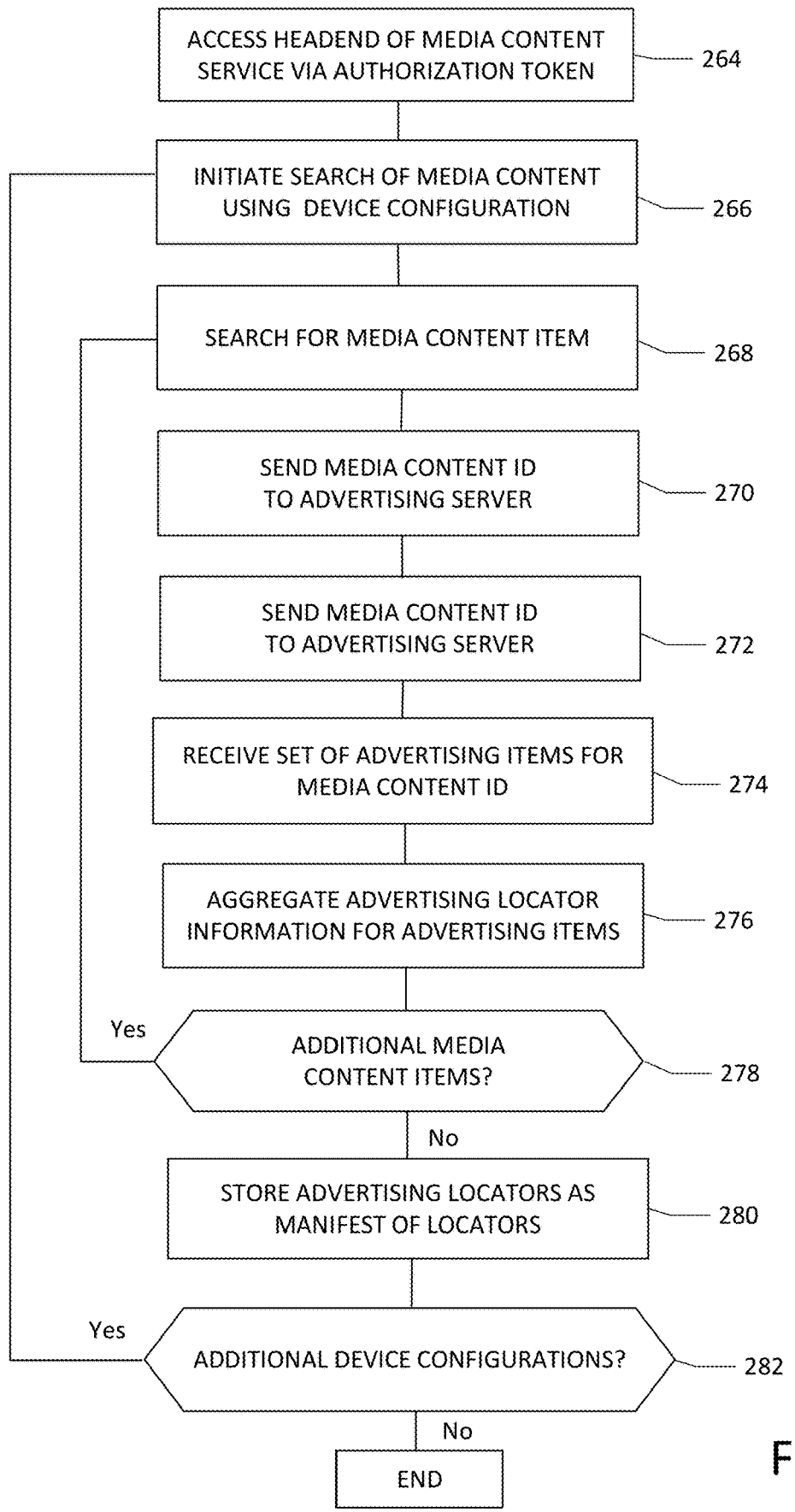
FIG. 2B depicts an illustrative embodiment of a method in accordance with various aspects described herein.

FIG. 2B depicts an illustrative embodiment of a method 260 in accordance with various aspects described herein. In step 264, the UURC 210 can access a media service headend 230 via an authorization token. The UURC 210 can thereby mimic a client device 124. In step 266, the UURC 210 can initiate a search of media content using a device configuration For example, the UURC 210 can mimic a client device configuration, where the device is an iPhone™ or has multiple displays. In one embodiment, the UURC 210 can initiate the search as a generic device. In step 268, the UURC 210 can search the headend 230 for a media content item. When the headend 230 responds, it can return an identity of the media content item in step 270.

In step 272, the UURC 210 can send the media content identity to an advertising server 240. The advertising server 240 can use the media content identity to select one or more advertisements. The advertising server 240 can return a set of advertising items that include a set of advertising locators in step 274. In 276, the UURC 210 can aggregate advertising locator information for the advertising items. The UURC 210 can categorize the advertising locators based on the configuration of the UURC 210. In step 278, the UURC 210 can determine if there are more media content items to search and, if so, return to step 268 to search for the next item. In step 280, the UURC 210 can store the advertising locators at a UURP server 220 as Sponsored Advertising manifest. In step 282, the UURC 210 can determine if the survey is to be repeated for another configuration of a client device.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B and 3. For example, virtualized communication network 300 can facilitate in whole or in part a server for performing a method for identifying dynamically inserted advertising that a network service provider intends to sponsor as part of a subscription data plan. The embodiments include a server that can access a headend of a media content server by emulating a client device, search for media content available from the media content server, receive a content identifier from the headend when the content is found, provide the content identity to an advertising server, receive a locator for a selected advertisement, and save the locator with other locators collected during the search of the available content as a white list manifest.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
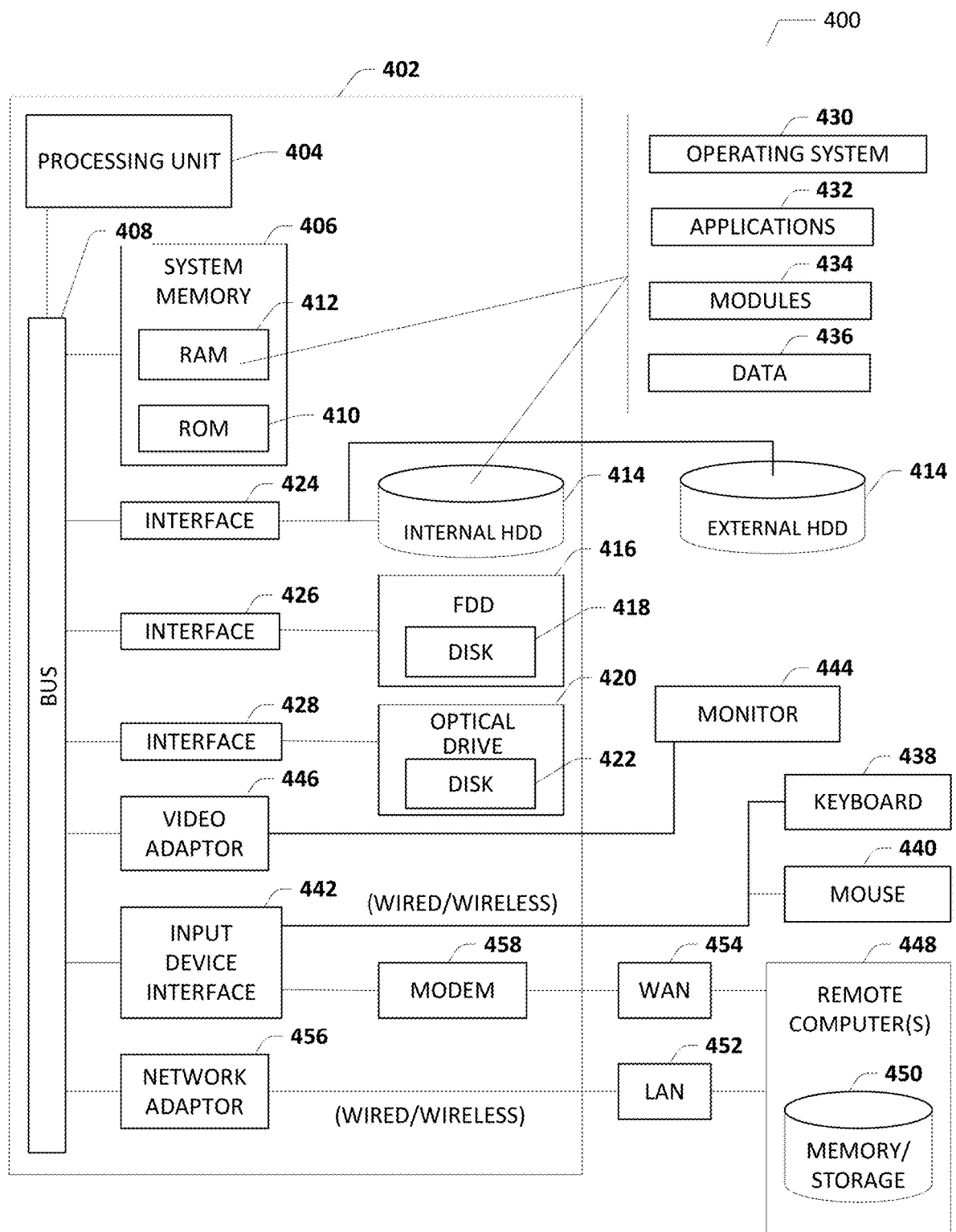
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part an apparatus for performing a method for identifying dynamically inserted advertising that a network service provider intends to sponsor as part of a subscription data plan. The embodiments include a server that can access a headend of a media content server by emulating a client device, search for media content available from the media content server, receive a content identifier from the headend when the content is found, provide the content identity to an advertising server, receive a locator for a selected advertisement, and save the locator with other locators collected during the search of the available content as a white list manifest.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
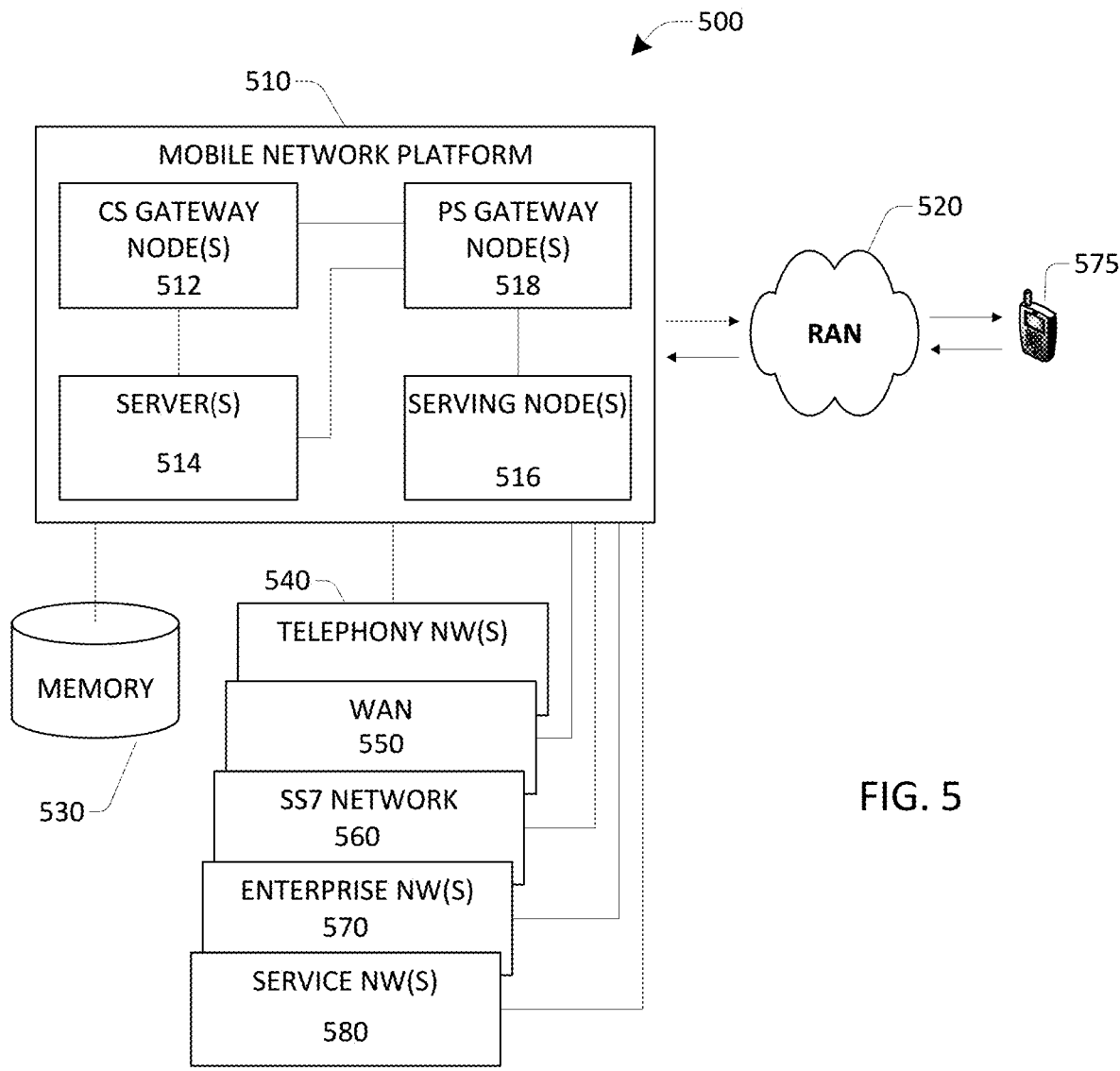
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part an apparatus for performing a method for identifying dynamically inserted advertising that a network service provider intends to sponsor as part of a subscription data plan. The embodiments include a server that can access a headend of a media content server by emulating a client device, search for media content available from the media content server, receive a content identifier from the headend when the content is found, provide the content identity to an advertising server, receive a locator for a selected advertisement, and save the locator with other locators collected during the search of the available content as a white list manifest. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
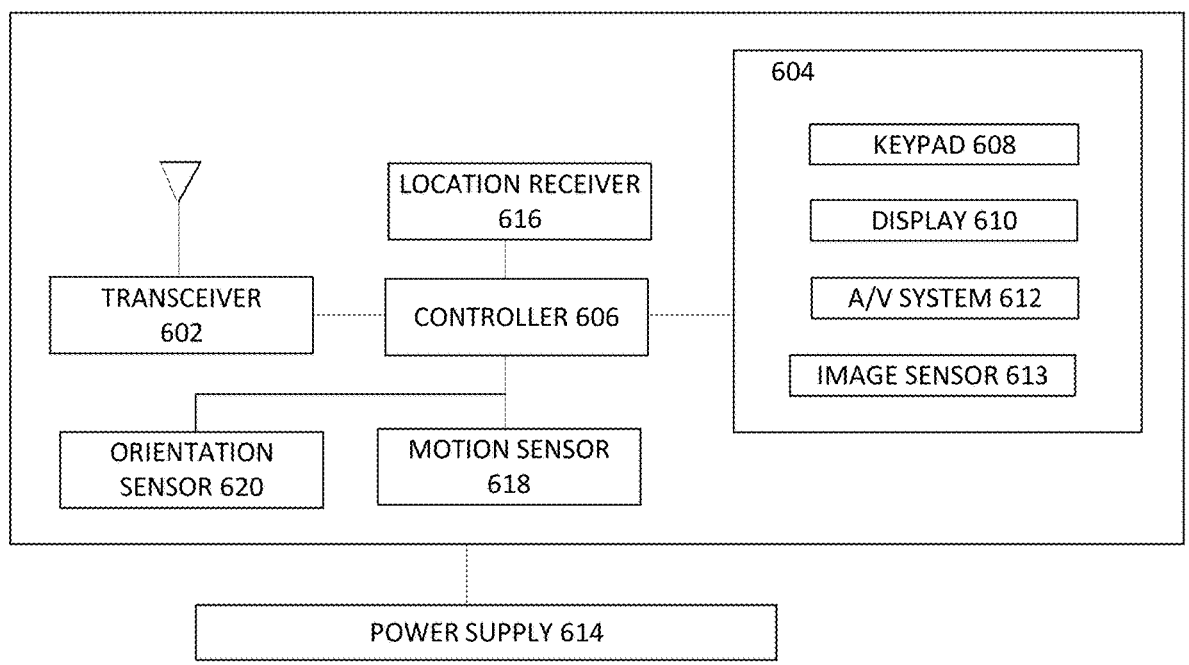
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part an apparatus for performing a method for identifying dynamically inserted advertising that a network service provider intends to sponsor as part of a subscription data plan. The embodiments include a server that can access a headend of a media content server by emulating a client device, search for media content available from the media content server, receive a content identifier from the headend when the content is found, provide the content identity to an advertising server, receive a locator for a selected advertisement, and save the locator with other locators collected during the search of the available content as a white list manifest.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAIVI). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to pre-determined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory, machine-readable storage medium, comprising executable instructions that, when executed by a processing system including a processor, facilitate performance of operations, comprising:

for each configuration of a client device of a media content service:
transmitting a request to access a headend of the media content service, wherein the request to access includes an authorization token to simulate the client device of the media content service;

receiving permission to access the headend of the media content service according to the authorization token;

for each media content item of a plurality of media content items accessible via the headend of the media content service:

searching for the media content item;

receiving a media content identifier associated with the media content item responsive to the searching;

sending the media content identifier to an advertising server;

receiving, from the advertising server, a set of advertising items associated with the media content identifier, wherein each advertising item of the set of advertising items includes advertising locator information; and aggregating the advertising locator information associated with the set of advertising items for the media content identifier to generate a plurality of advertising locators associated with the plurality of media content items; and storing the plurality of advertising locators associated with the plurality of media content items accessible via the headend of the media content service according to the configuration of the client device as a manifest of advertising locators for the configuration of the client device.

2. The non-transitory, machine-readable storage medium of claim 1, wherein the processing system comprises a plurality of processors operating in a distributed processing environment.

3. The non-transitory, machine-readable storage medium of claim 2, wherein the manifest of advertising locators facilitates a network delivery rate arrangement according to a subscription agreement.

4. The non-transitory, machine-readable storage medium of claim 1, wherein the client device includes a mobile communication device.

5. The non-transitory, machine-readable storage medium of claim 4, wherein the configuration includes a type of the client device.

6. The non-transitory, machine-readable storage medium of claim 4, wherein the configuration includes a capability of the client device.

7. The non-transitory, machine-readable storage medium of claim 1, wherein a first portion of the set of advertising items is provided to the advertising server by a first advertising retailer, and wherein a second portion of the set of advertising items is provided to the advertising server by a second advertising retailer.

8. The non-transitory, machine-readable storage medium of claim 1, wherein the advertising locator information includes a uniform resource locator.

9. A device, comprising:
a processing system including a processor; and
a memory that stores executable instructions that, when executed by the processing system, facilitate performance of operations, comprising:

for each configuration of a client device of a media content service:

accessing a headend of the media content service wherein the accessing is by sending an access request to the headend of the media content service;

for each media content item of a plurality of media content items accessible via the headend of the media content service:

receiving a media content identifier associated with the media content item;

sending the media content identifier to an advertising server;

receiving, from the advertising server, a set of advertising items associated with the media content identifier, wherein each advertising item of the set of advertising items includes advertising locator information; and aggregating the advertising locator information associated with the set of advertising items for the media content identifier to generate a plurality of advertising locators associated with the plurality of media content items; and storing the plurality of advertising locators associated with the plurality of media content items accessible via the headend of the media content service according to the configuration of the client device as a manifest of advertising locators for the configuration of the client device wherein the manifest of advertising locators facilitates a network delivery rate arrangement according to a subscription agreement.

10. The device of claim 9, wherein the accessing of the headend of the media content service includes an authorization token to simulate the client device of the media content service.

11. The device of claim 10, wherein the operations further comprise receiving a permission to access the headend of the media content service according to the authorization token.

12. The device of claim 9, wherein the operations further comprise searching for the media content item, wherein the receiving of the media content identifier is responsive to the searching.

13. The device of claim 9, wherein the advertising locator information includes a uniform resource locator.

14. The device of claim 9, wherein the client device includes a mobile communication device.

15. The device of claim 9, wherein the configuration includes a type of the client device, a capability of the client device, or any combination thereof.

16. A method, comprising:
for each configuration of a client device of a media content service:

accessing, by a processing system including a processor, a headend of the media content service;

for each media content item of a plurality of media content items accessible via the headend of the media content service:

receiving, by the processing system, a media content identifier associated with the media content item;

sending, by the processing system, the media content identifier to an advertising server;

receiving, by the processing system, from the advertising server, a set of advertising items associated with the media content identifier, wherein each advertising item of the set of advertising items includes advertising locator information; and aggregating, by the processing system, the advertising locator information associated with the set of advertising items for the media content identifier to generate a plurality of advertising locators associated with the plurality of media content items; and storing, by the processing system, the plurality of advertising locators associated with the plurality of media content items accessible via the headend of the media content service according to the configuration of the client device as a manifest of advertising locators for the configuration of the client device.

17. The method of claim 16, wherein the accessing of the headend of the media content service includes an authorization token to simulate the client device of the media content service.

18. The method of claim 17, further comprising receiving, by the processing system, a permission to access the headend of the media content service according to the authorization token.

19. The method of claim 16, wherein the accessing is by sending an access request to the headend of the media content service.

20. The method of claim 16, wherein the manifest of advertising locators facilitates a network delivery rate arrangement according to a subscription agreement.

* * * * *